United States Patent
Cuzzola et al.

(10) Patent No.: US 9,288,308 B2
(45) Date of Patent: Mar. 15, 2016

(54) METHOD FOR TERMINATING AN OPERATION OF A CPE DEVICE, AND RESPECTIVE CPE DEVICE USING THE METHOD

(71) Applicant: THOMSON LICENSING, Issy de Moulineaux (FR)

(72) Inventors: Massimo Cuzzola, Wilrijk (BE); Oliver Chef, Evere (BE); Bart Persoons, Edegem (BE)

(73) Assignee: Thomson Licensing, Issy-les-Moulineaux (FR)

( * ) Notice: Subject to any disclaimer, the term of this patent is extended or adjusted under 35 U.S.C. 154(b) by 0 days.

(21) Appl. No.: 14/406,221

(22) PCT Filed: May 21, 2013

(86) PCT No.: PCT/EP2013/060388
§ 371 (c)(1),
(2) Date: Dec. 7, 2014

(87) PCT Pub. No.: WO2013/182414
PCT Pub. Date: Dec. 12, 2013

(65) Prior Publication Data
US 2015/0124859 A1    May 7, 2015

(30) Foreign Application Priority Data

Jun. 8, 2012  (EP) .................................... 12305659
Mar. 20, 2013  (EP) .................................... 13305337

(51) Int. Cl.
*H04B 1/38* (2015.01)
*H04M 3/00* (2006.01)
(Continued)

(52) U.S. Cl.
CPC .............. *H04M 3/007* (2013.01); *H04L 12/12* (2013.01); *H04L 12/2898* (2013.01); *H04M 11/062* (2013.01); *Y02B 60/34* (2013.01); *Y02B 60/36* (2013.01)

(58) Field of Classification Search
CPC ....................................................... H04M 3/007
USPC .......................................................... 375/222
See application file for complete search history.

(56) References Cited

U.S. PATENT DOCUMENTS 5,357,211 A * 10/1994  Bryson et al. ................. 330/263
8,693,314 B1 * 4/2014  Horton et al. ................. 370/220
(Continued)

FOREIGN PATENT DOCUMENTS

CN        101277128 B       9/2011
FR        2951837            4/2011
(Continued)

OTHER PUBLICATIONS

Lu et al: "A Fast Channel Estimation Method for Disorderly Leaving Events in Vectored DSL Systems"; ICC 2011;IEEE; 6 pages; Jun. 2011.
(Continued)

*Primary Examiner* — Lihong Yu
(74) *Attorney, Agent, or Firm* — Myers Wolin LLC

(57) ABSTRACT

The method for terminating an operation of a CPE device, which comprises a front-end component for an xDSL connection of a Central Office Equipment supplying a multitude of customers, comprises the steps of: sending a power loss information to the Central Office Equipment in case of a power loss or a switch-off operation of the CPE device and powering the front-end component for a predetermined time to avoid a termination impedance change of the front-end component, by keeping the supply power up for the front-end component, to keep the termination impedance stable as long as necessary for the Central Office Equipment to avoid introduction of non-cancelled crosstalk, which may arise in xDSL connections of other customers.

13 Claims, 3 Drawing Sheets

(51) Int. Cl.
*H04M 11/06* (2006.01)
*H04L 12/12* (2006.01)
*H04L 12/28* (2006.01)

(56) References Cited

U.S. PATENT DOCUMENTS

| | | |
|---|---|---|
| 2003/0035377 A1 | 2/2003 | Ju |
| 2007/0041436 A1 | 2/2007 | Yang |
| 2010/0238987 A1* | 9/2010 | Engstrom et al. ............ 375/222 |
| 2011/0054721 A1* | 3/2011 | Goodrich et al. ............... 701/14 |
| 2012/0287976 A1* | 11/2012 | Cho et al. .................... 375/222 |

FOREIGN PATENT DOCUMENTS

| | | |
|---|---|---|
| JP | 2006180331 | 7/2006 |
| WO | WO2011009593 A3 | 1/2011 |

OTHER PUBLICATIONS

Oksman etal: "The ITU-T's New G vector Standard Proliferates 100 Mbs DSL"; IEEE Communications Magazine; Oct. 2010; pp. 140-148.

ITU-T Standard Sector of ITU, "Series G: Transmission Systems and Media Digital Systems and Network" REC-G.993.5; Apr. 2010.

Search Report Dated Jul. 24, 2013.

\* cited by examiner

METHOD FOR TERMINATING AN OPERATION OF A CPE DEVICE, AND RESPECTIVE CPE DEVICE USING THE METHOD

This application claims the benefit, under 35 U.S.C. §365 of International Application PCT/EP2013/060388, filed May 21, 2013, which was published in accordance with PCT Article 21(2) on Dec. 12, 2013 in English and which claims the benefit of European patent application No. 12305659.0, filed Jun. 8, 2012 and European patent application No. 13305337.1, filed Mar. 20, 2013.

TECHNICAL FIELD

The invention relates to the field of customer premises equipment devices, coupled via a digital subscriber line to a service provider delivering broadband services to a customer.

BACKGROUND OF THE INVENTION

Residential gateways are widely used to connect devices in a home of a customer to the Internet or any other wide area network (WAN). Residential gateways use for example digital subscriber line (DSL) technology that enables a high data rate transmission over copper lines. During the years, several DSL standards have been established differing in data rates and in range, for example ADSL, ADSL2, VDSL and VDSL2, which are referred to in this context as xDSL. Network operators, e.g. Internet service providers (ISP), are managing a large amount, up to millions, of residential gateways, also other devices such as routers, switches, telephones and set-top boxes, which are understood in this context as customer premises equipment (CPE) devices.

A wide area network providing xDSL services for a home network of a customer is schematically shown in FIG. 1: an ISP network 1 of the ISP is connected via an Internet router 7 with the global Internet 8 for providing Internet services to a residential gateway 2 and one or several client devices 3 of the customer. The connection between the ISP network 1 and the residential gateway 2 is provided by using a broadband remote access server (BRAS) 6 and a digital subscriber line access multiplexer (DSLAM) 5. The BRAS 6 may be provided within a Central Office of the ISP, together with the Internet router 7, whereas the DSLAM 5 is located close to the CPE device 2. The BRAS 6 and the DSLAM 5 are understood in the context of this application as a part of a Central Office Equipment of the ISP. Via xDSL connections 4, the residential gateway 2 and also home networks of other customers are coupled with the same DSLAM 5 of the ISP.

A Vectored VDSL2 system is a VDSL2 system that supports a self-FEXT (far-end crosstalk) cancellation technique. A "Vectored VDSL2 DSLAM" contains an array of collocated VDSL2 transceivers that are connected to a group of lines in a cable referred to as the vectored group. To support FEXT cancellation in the downstream direction to the customers, the transmission of the VDSL2 signals must all be coordinated as follows: all the signals operate with the same sub-carrier spacing, symbol rate, and cyclic extension length; in addition, the data symbols must be all phase aligned when transmitted on the line. Assuming the channel coupling matrices for the vectored group are known, downstream self FEXT cancellation is achieved as follows: the transmit data samples, all being transmitted phase synchronously, are processed through the equivalent of a pre-coder matrix. The pre-coder matrix effectively implements the inverse of a crosstalk channel matrix such that when the data samples are received at a far-end DSL receiver of a customer, the self far-end crosstalk injected in the cable by the transmitted data samples is effectively removed at the receiver input in the CPE.

The pre-coder matrix is constructed for all of the sub-carriers in the VDSL2 frequency bands for which self-FEXT is to be cancelled. Each transceiver in the vectored group of lines can be seen as processing one row of the pre-coder matrix taking data sample inputs from the neighboring transmitters for pre-coding. In other words, the crosstalk cancelling technique is achieved by injecting an "anti-signal" on each crosstalk-impaired line. In order to do that, a vector system needs a mechanism to estimate the crosstalk in order to derive the crosstalk coefficients, to invert the crosstalk matrix—each CPE will feedback to the DSLAM its own crosstalk coefficients, and the DSLAM will construct a matrix in which each row represents a CPE's feedback—and to calculate the "anti-signal".

A more detailed description of the new G.vector standard, as specified by the ITU-T G.993.5 recommendation, and far-end (FEXT) and near-end crosstalk (NEXT) cancellation principles are described in V. Oksman "The ITU-T's New G.vector Standard Proliferates 100 Mb/s DSL", IEEE Communications Magazine, October 2010, p. 140-148.

In Chenguang Lu et al, "A Fast Channel Estimation Method for Disorderly Leaving Events in Vectored DSL Systems", ICC 2011-2011 IEEE International Conference on Communications, 6 pp., 5-9 Jun. 2011, a fast channel estimation method for disorderly leaving events in vectored DSL systems is described, which needs only a few error samples for providing channel tracking, in case the CPE device is unplugged or turned off.

SUMMARY OF THE INVENTION

The method for terminating an operation of a CPE device, which comprises a front-end component for an xDSL connection of a Central Office Equipment supplying a multitude of customers, comprises the steps of: sending a power loss information to the Central Office Equipment in case of a power loss or a switch-off operation of the CPE device and powering the front-end component for a predetermined time to avoid a termination impedance change of the front-end component, by keeping the supply power up for the front-end component, to keep the termination impedance stable as long as necessary for the Central Office Equipment, to avoid introduction of non-cancelled crosstalk, which may arise in xDSL connections of other customers because of the power loss or switch-off operation of the CPE device.

The front-end component is decoupled from a central processing unit of the CPE device in particular by means of an isolation means, e.g. a switch or a rectifying element, in order to isolate a supply voltage for the front-end component from a supply voltage for the central processing unit.

In a further aspect of the invention, the CPE device shuts down an upstream signal of an upstream transmit path of the xDSL connection in case of a power loss or switch-off operation of the CPE device, but keeps the upstream transmit path powered, to not influence the line termination impedance of the xDSL connection. In addition, the presence of a downstream signal of the Central Office Equipment is monitored on a downstream transmit path of the xDSL connection, and in case the downstream signal is no more present, the upstream transmit path of the xDSL connection is powered off.

The CPE device comprises a central processing unit, a front-end component for an xDSL connection with a Central Office Equipment, a power supply unit providing a first supply voltage for the central processing unit and a second supply voltage for the front-end component, and an isolation means for decoupling the second supply voltage from the first supply voltage. In case of a power loss or a switch-off operation of the CPE device, the CPE device sends a power loss information to the Central Office Equipment, wherein the front-end component remains active for a predetermined time period after the power loss or the switch-off operation to avoid a termination impedance change of the front-end component for the predetermined time period.

The CPE device comprises in particular a charge capacitor coupled to the front-end component and filtering the second supply voltage for providing a charge to the front-end component when the power supply is switched off or in case of a power loss, wherein the capacity of the charge capacitor is sufficient for powering the front-end component for the predetermined time.

In a preferred embodiment, the CPE device comprises further a delaying circuit for a power switch of the CPE device arranged such that as soon as the power switch is pushed, the CPE device will send a power down indication to the Central Office Equipment, but the power supply unit of the CPE device is switched off with a delay determined by the delaying circuit.

BRIEF DESCRIPTION OF THE DRAWINGS

Preferred embodiments of the invention are explained in more detail below by way of example with reference to schematic drawings, which show.

DETAILED DESCRIPTION OF PREFERRED EMBODIMENTS

In the following description, a Customer Premises Equipment (CPE) device comprising a front-end component, e.g. a line driver, for an xDSL connection is described. For purposes of explanation, numerous specific details are set forth in order to provide a thorough understanding of preferred embodiments. It will be evident, however, to one skilled in the art that the present invention may be practiced without these specific details.

The CPE device is for example a residential gateway, a router or a switch, and includes a central processing unit, a non-volatile memory, in which an operating system and applications are stored, and a volatile memory for the operation of the CPE device. The CPE device includes in particular hardware and software components for providing an xDSL modem function, gateway and switching functions, and may include further FXS functions, VoIP functionality and Wi-Fi operation.

Figure 1:
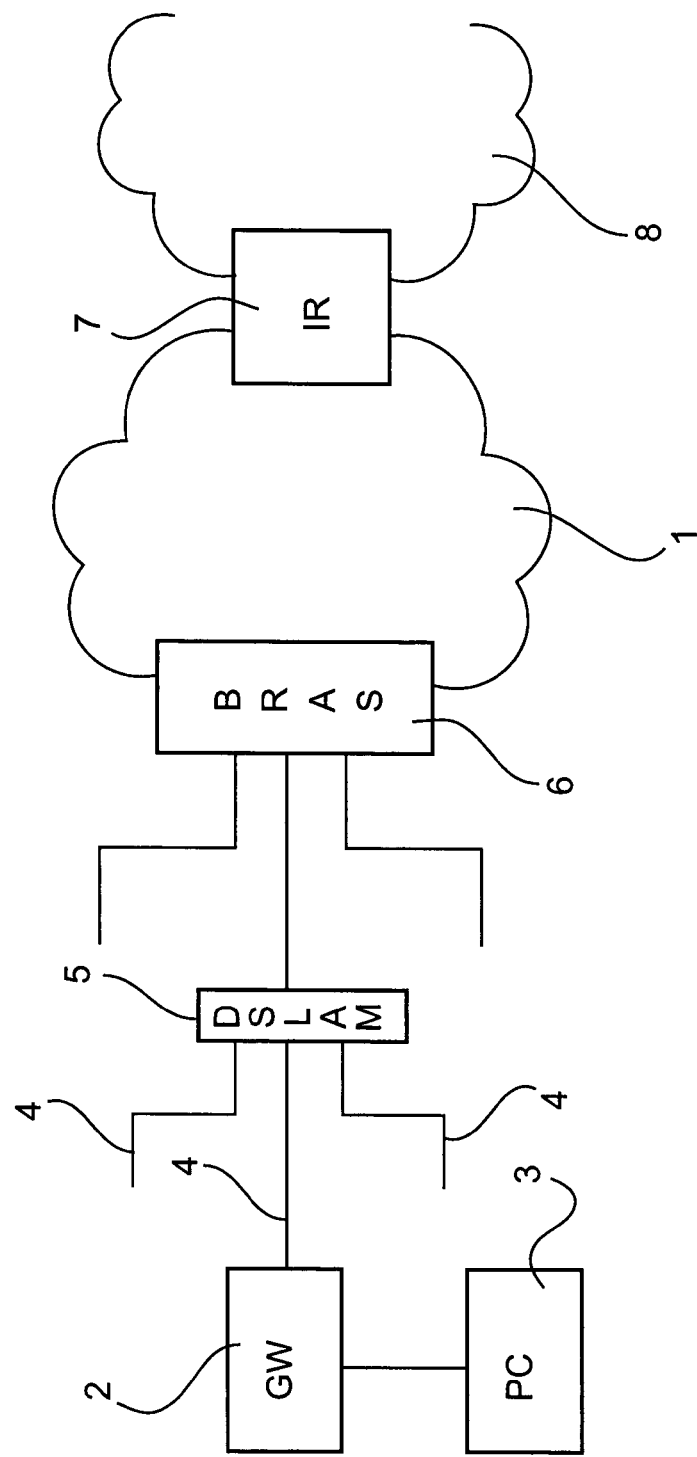
FIG. 1 A wide area network providing xDSL services for a home network of a customer, FIG. 2 a prior art CPE device comprising an xDSL line driver for an xDSL connection, FIG. 3 a CPE device according to the invention, and FIG. 4 a method for a termination of the operation of a CPE device.
Figure 2:
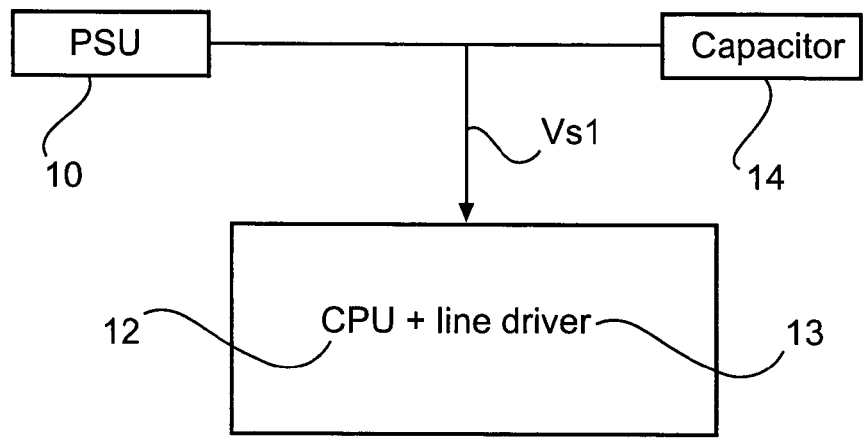

An essential part of the CPE device for operating the xDSL connection is a line driver, the front-end component receiving and providing the data signals for communicating with the central office, e.g. the DSLAM. In a prior art CPE device as shown in FIG. 2, a line driver 13 is provided together with a central processing unit 12 with a supply voltage Vs1 by a power supply unit 10. A charge capacitor 14 is coupled to the supply voltage Vs1 for filtering of the supply voltage Vs1.

Figure 3:
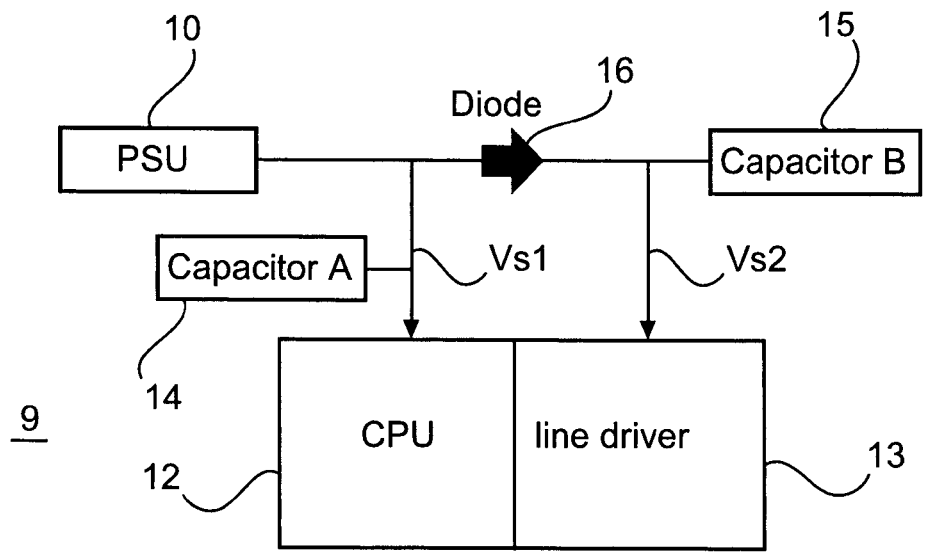

According to the invention, an isolation means, a decoupling element 16, is included in a CPE device 9 to decouple the supply voltage for the line driver 13, supply voltage Vs2, from the supply voltage Vs1 as provided for the central processing unit 12, as shown in FIG. 3. In addition, a further charge capacitor 15 is included for filtering the supply voltage Vs2. The capacity of the charge capacitor 15 is dimensioned such that in case of a power loss or a switch-off operation of the CPE device, the line driver 13 remains active for a predetermined time period to avoid any impedance change of the line driver 13, before the DSLAM has terminated the DSL connection for the CPE device 9. The decoupling element 16 is for example a rectifying element, e.g. a diode, or any switch, arranged to avoid that the central processing unit 12 and other parts of the CPE device 9 are powered by the capacitor 15, when the power supply unit 10 is off.

With this solution, it is possible to maintain the line driver 13 active for a much longer time in comparison with the arrangement of FIG. 2 in case of a power loss or a switch off operation, because the capacitor 15 is isolated from the power supply unit 10 and the capacitor 14. The time for which the line driver 13 remains active, after the power supply unit 10 stops operating, is determined by the capacity value of the capacitor 15 and can be adjusted such that the line impedance of the line driver 13 remains stable as long as necessary for the DSLAM to terminate the DSL connection to the CPE device 9.

In case of a power loss or a switch off operation, the CPE device 9 sends a power loss indication to the DSLAM, known as a dying gasp signal, to warn the DSLAM of the power loss event. In this way, the line termination impedance of the line driver 13 remains stable for a sufficient time, until the DSLAM removes this DSL line from the vector group to avoid introduction of non-cancelled crosstalk from this DSL line into the other DSL lines of the vector group, to which the CPE device 9 belongs.

Figure 4:
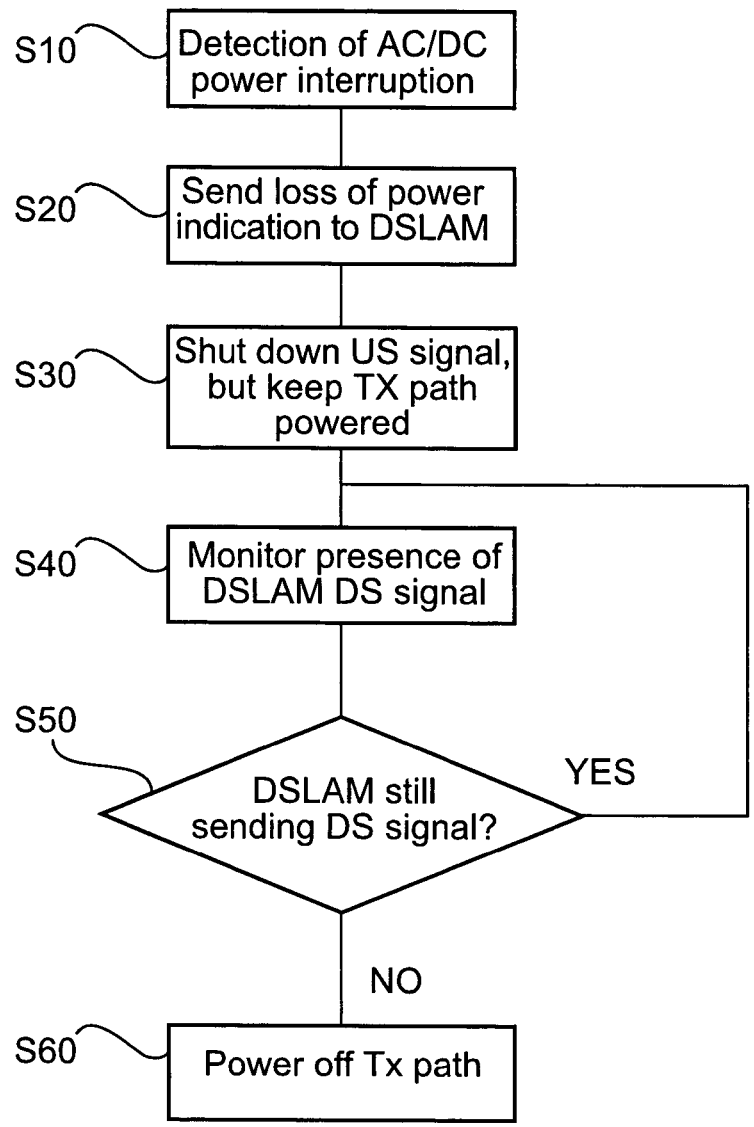

The CPE device 9 terminates the operation in accordance with the following method steps, as shown in FIG. 4. In case of any AC power interruption, e.g. when the CPE device 9 is switched off or a user pulls the power plug of the CPE device 9, or in case of any internal DC power failure, the power interruption is detected by the CPE device 9, e.g. by the central processing unit 12, step S10. The CPE device 9 then sends immediately a power loss indication signal to the central office equipment, e.g. the DSLAM, step S20. In a further step S30, the upstream modulation signal to the DSLAM is terminated, but the transmit path of the DSL connection remains powered by the line driver 13 to avoid an impedance change of the line driver 13. The line driver 13 is still powered by the supply voltage VS2 for a predetermined time period, FIG. 3, because the capacitor 15 is decoupled by the diode 16 from the power supply unit 10. This guaranties that the line driver 13 does not change its front end impedance for the DSL connection, until the DSLAM has terminated the DSL connection to the CPE device 9.

In a further step S40, the CPE device 9 monitors the presence of a DSLAM downstream signal, which gives the CPE device 9 the information that its DSL connection is still included in the vectored DSL operation of the DSLAM. The CPE device 9 monitors the downstream signal of the DSLAM until the DSLAM switches off the downstream signal, step S50. In this case, the upstream transmit path of the CPE device 9 is terminated by the CPE device, step S60, by switching off the line driver 13 by e.g. the central processing unit 12. The downstream signal of the DSLAM may be monitored for example via the line driver 13. Alternatively, the capacity of the capacitor 15 is dimensioned such that the line driver 13 remains active after a power loss indication for powering the transmit path of the DSL connection for a predetermined time, which is in all cases sufficiently long so that the DSLAM can terminate the downstream connection to the CPE device 9 to avoid any FEXT, after receiving the power loss indication of the CPE device 9 transmitted to the DSLAM.

The CPE device 9 may include in addition a soft switch function for its power switch, e.g. a delaying circuit included in the power switch, such that the power supply unit 10 remains operating for a predetermined time period, after the CPE device 9 is switched off via the power switch, or e.g. a software switch-off command. In this case, that CPE device 9 sends in response to the switching-off of the CPE device 9 a power loss indication to the DSLAM, but keeps the power supply unit 10 operating. In further steps, the upstream modulation signal to the DSLAM is terminated and the downstream signal of the DSLAM is monitored, but the transmit path of the CPE device 9 to the DSLAM remains powered, because the line driver 13 is still operating. When the CPE device 9 detects finally that the DSLAM is no more sending a downstream signal, then the power supply unit 10 is switched off by the central processing unit 12 via the soft switch, to terminate the operation of the CPE device 9. Alternatively, a timer is used to operate the line driver 13 for a predetermined time period being sufficiently long so that the DSLAM can terminate the downstream connection to the CPE device, after receiving the power loss indication of the CPE device transmitted to the DSLAM, to avoid any FEXT. After the predetermined time period, the CPE device 9 is switched off by the timer via the soft switch.

The CPE device is therefore designed such that under all circumstances the termination impedance of the front-end component is maintained for a time period sufficient for the DSLAM to remove the CPE device from the vectored DSL connection, so that FEXT for the vectored DSL connection is avoided. Keeping the termination impedance of the front-end component unchanged is fundamental for a vectored DSL group to make sure that the DSLAM will not inject uncancelled crosstalk to the DSL connection into all other DSL lines of the vector group by any disorderly leaving events of the CPE device. Any case of turning off the CPE device by a customer for any reason, intentionally or accidentally, is not acceptable for an operator prospective, because this effects the quality and the stability of other customers that are within the same vectored DSL group. Respective instabilities in the vectored DSL group could lead to unnecessary service calls by other customers and leads to doubts on the quality of the DSL service as provided by the network service provider. With the invention, the CPE device is therefore safely removed from the vectored DSL group for all cases in which the CPE device terminates the operation, so that the quality of operation is not affected for the other customers using the same vectored DSL group.

Also other embodiments of the invention may be utilized by one skilled in the art without departing from the scope of the present invention. The invention is in particular not limited to residential gateways and may be used advantageously also for all kinds of other CPE devices, e.g. routers, switches, telephones and set-top boxes. The invention resides therefore in the claims herein after appended.

The invention claimed is:

1. A method for terminating an operation of a customer premises equipment (CPE) device comprising a line driver for a digital subscriber line (DSL) connection to a Central Office Equipment supplying a multitude of customers, comprising:
    in case of a power loss or a switch-off operation of the CPE device, sending a power loss information to the Central Office Equipment;
    decoupling the line driver from a central processor of the CPE device in order to isolate a supply voltage of the line driver from a supply voltage of the central processor;
    powering the line driver for a time period to avoid a termination impedance change of the line driver by keeping the supply voltage up for the line driver, to keep the termination impedance stable for the time period for the Central Office Equipment to avoid introduction of non-cancelled crosstalk;
    shutting down an upstream signal of an upstream transmit path of the DSL connection, but keeping the upstream transmit path powered, to not influence the termination impedance of the line driver; and
    monitoring a presence of a downstream signal of the Central Office Equipment on a downstream transmit path of the DSL connection, and in case the downstream signal is no more present, powering off the upstream transmit path of the DSL connection.

2. The method of claim 1, wherein the DSL connection is a vectored very high bit rate DSL (VDSL) connection.

3. The method of claim 2, further comprising having a rectifying element in order to isolate the supply voltage of the line driver from the supply voltage of the central processor.

4. The method of claim 1, wherein the power loss information is a dying gasp power loss indication.

5. The method of claim 1, further comprising including a delaying circuit to a power switch of the CPE device such that as soon as the power switch is pushed, the CPE device will send the power loss information to the Central Office Equipment and switches off the power by the power switch with a delay determined by the delaying circuit.

6. A customer premises equipment (CPE) device comprising
    a central processor;
    a line driver for a digital subscriber line (DSL) connection with a Central Office Equipment;
    a power supply configured to provide a first supply voltage for the central processor and a second supply voltage for the line driver;
    a rectifying element configured to decouple the second supply voltage from the first supply voltage;
    a capacitor configured to filter the second supply voltage and being coupled to the line driver, the capacitor further configured to supply a charge to the line driver when the power supply is switched off or in case of a power loss;
    wherein the CPE device is configured to send a power loss information to the Central Office Equipment in case of a power loss or a switch-off operation of the CPE device and the line driver remains active for a time period after the power loss or the switch-off operation to avoid a termination impedance change of the line driver during the time period;
    the CPE device shuts down an upstream signal of an upstream transmit path of the DSL connection in case of a power loss or a switch-off operation of the CPE device, but keeps the upstream transmit path powered, to not influence the termination impedance of the line driver; and
    the line driver is configured to switch off said upstream transmit path of the DSL connection after expiration of a timer or after detection of a disappearance of a downstream signal.

7. The CPE device of claim 6, wherein a capacity of the capacitor is sufficient for powering the line driver for the time period, to keep the termination impedance of the line driver stable to avoid introduction of non-cancelled crosstalk.

8. The CPE device of claim 6, wherein the capacitor comprises a capacity sufficient to keep the line driver operating for at least 50 msec after switching off of the power supply or in case of a power loss.

9. The CPE device of claim 6, wherein the CPE device comprises a power switch with a delaying function such that the CPE device, after switching off, remains on for said time period, and then switches off the CPE device.

10. The CPE device of claim 6, wherein the upstream transmit path of the DSL connection remains powered by the line driver for said time period.

11. The CPE device of claim 6, wherein the downstream signal is a signal of a digital subscriber line access multiplexer (DSLAM).

12. The CPE device of claim 6, wherein the CPE device is a residential gateway.

13. The CPE device of claim 6, wherein the CPE device is designed for an operation with a Central Office Equipment via a vectored very high bit rate digital subscriber line 2 (VDSL2) broadband connection.

\* \* \* \* \*